(12) United States Patent
Kursawe et al.

(10) Patent No.: US 10,328,629 B2
(45) Date of Patent: Jun. 25, 2019

(54) APPARATUS FOR HEATING PLASTICS MATERIAL PRE-FORMS

(71) Applicant: KRONES AG, Neutraubling (DE)

(72) Inventors: Andreas Kursawe, Kirchroth (DE); Konrad Senn, Regensburg (DE)

(73) Assignee: KRONES AG, Neutraubling (DE)

(*) Notice: Subject to any disclaimer, the term of this patent is extended or adjusted under 35 U.S.C. 154(b) by 645 days.

(21) Appl. No.: 14/100,653

(22) Filed: Dec. 9, 2013

(65) Prior Publication Data
US 2014/0166642 A1    Jun. 19, 2014

(30) Foreign Application Priority Data

Dec. 17, 2012  (DE) .................. 10 2012 112 370

(51) Int. Cl.
*B29C 49/64* (2006.01)
*B29C 49/78* (2006.01)
*B29C 49/06* (2006.01)
*B29C 49/68* (2006.01)
*B29C 49/28* (2006.01)

(52) U.S. Cl.
CPC .......... *B29C 49/6418* (2013.01); *B29C 49/06* (2013.01); *B29C 49/6409* (2013.01); *B29C 49/6436* (2013.01); *B29C 49/68* (2013.01); *B29C 49/786* (2013.01); *B29C 2049/283* (2013.01); *B29C 2949/78151* (2013.01); *B29C 2949/78663* (2013.01)

(58) Field of Classification Search
CPC .... B29C 2049/283; B29C 2949/78151; B29C 2949/78663; B29C 49/06; B29C 49/6409; B29C 49/6418; B29C 49/6436; B29C 49/68; B29C 49/786

USPC ................ 219/701, 705, 704; 264/535, 532; 425/526, 174.2, 150, 162, 479, 507, 156, 425/404, 430; 164/326, 479, 507
See application file for complete search history.

(56) References Cited

U.S. PATENT DOCUMENTS 2,834,986 A * 5/1958 Bailey ..................... B29C 33/36
                                                        164/326
3,000,052 A * 9/1961 Soubier .................. B29C 47/26
                                                        264/161
(Continued)

FOREIGN PATENT DOCUMENTS

DE            20309576      11/2003
DE     10 2008 012757       9/2009
(Continued)

*Primary Examiner* — Dana Ross
*Assistant Examiner* — Ket D Dang
(74) *Attorney, Agent, or Firm* — Greer, Burns & Crain, Ltd.

(57) ABSTRACT

An apparatus is provided for heating plastics material pre-forms, with a movable carrier on which a plurality of heating devices is arranged; wherein the heating devices are controllable independently of one another and have in each case a heating element as well as at least one regulating element for regulating the heating output; and wherein the heating devices have in each case one heating area inside which the plastics material pre-forms are capable of being heated, as well as a movement device which introduces the plastics material pre-forms into this heating area. Each heating device has associated with it in each case one control device for controlling a heating procedure.

16 Claims, 1 Drawing Sheet

(56) References Cited

U.S. PATENT DOCUMENTS

| | | | | |
|---|---|---|---|---|
| 3,240,915 | A * | 3/1966 | Carter | H05B 3/0047 |
| | | | | 118/725 |
| 3,822,867 | A * | 7/1974 | Evans | B29C 45/50 |
| | | | | 264/328.14 |
| 4,913,912 | A * | 4/1990 | Leverenz | B29C 45/30 |
| | | | | 264/328.15 |
| 5,676,871 | A * | 10/1997 | Graves | A45D 4/16 |
| | | | | 219/222 |
| 5,942,259 | A | 8/1999 | Uchiyama et al. | |
| 7,653,460 | B2 * | 1/2010 | Manda | B22D 17/32 |
| | | | | 264/209.7 |
| 2001/0035405 | A1 * | 11/2001 | Deo | H05B 3/74 |
| | | | | 219/460.1 |
| 2002/0008101 | A1 * | 1/2002 | Hauschulz | G05D 23/1934 |
| | | | | 219/494 |
| 2008/0241299 | A1 * | 10/2008 | Bazzo | B29C 45/7666 |
| | | | | 425/144 |
| 2008/0289791 | A1 * | 11/2008 | Erhard | B22D 17/20 |
| | | | | 164/154.6 |
| 2009/0102083 | A1 * | 4/2009 | Cochran | B29B 13/023 |
| | | | | 264/40.6 |
| 2009/0261513 | A1 * | 10/2009 | Forsthovel | B29C 49/6436 |
| | | | | 264/410 |
| 2010/0001439 | A1 * | 1/2010 | Bock | B25J 15/0023 |
| | | | | 264/528 |
| 2010/0052224 | A1 * | 3/2010 | Humele | B29B 13/024 |
| | | | | 264/489 |
| 2010/0181309 | A1 * | 7/2010 | Senn | B29B 13/024 |
| | | | | 219/756 |
| 2011/0024953 | A1 * | 2/2011 | Winzinger | B29C 49/12 |
| | | | | 264/531 |
| 2011/0062611 | A1 * | 3/2011 | Menary | B29C 49/6445 |
| | | | | 264/40.1 |
| 2011/0084064 | A1 * | 4/2011 | Zimmerer | B29C 49/6418 |
| | | | | 219/678 |
| 2011/0132892 | A1 * | 6/2011 | Winzinger | B29B 13/024 |
| | | | | 219/420 |
| 2011/0253708 | A1 * | 10/2011 | Zimmerer | B29B 13/024 |
| | | | | 219/761 |
| 2011/0260350 | A1 * | 10/2011 | Haesendonckx | B29C 49/78 |
| | | | | 264/40.1 |
| 2012/0014626 | A1 * | 1/2012 | Watanabe | B22D 19/00 |
| | | | | 384/26 |
| 2012/0091636 | A1 * | 4/2012 | Voth | B29C 49/4205 |
| | | | | 264/535 |
| 2012/0100238 | A1 * | 4/2012 | Humele | B29C 49/28 |
| | | | | 425/90 |
| 2012/0111700 | A1 * | 5/2012 | Gillet | B29C 49/4205 |
| | | | | 198/793 |
| 2013/0011807 | A1 | 1/2013 | Winzinger et al. | |

FOREIGN PATENT DOCUMENTS

| | | | | |
|---|---|---|---|---|
| DE | 10 2008 039375 | | 2/2010 | |
| EP | 2441563 A2 * | | 4/2012 | B29C 49/42 |
| WO | WO 2010063686 A2 * | | 6/2010 | B29B 13/024 |
| WO | WO 2010063686 A3 * | | 8/2010 | B29B 13/024 |
| WO | WO 2010112307 A1 * | | 10/2010 | B29C 49/4205 |

* cited by examiner

APPARATUS FOR HEATING PLASTICS MATERIAL PRE-FORMS

BACKGROUND

The present invention relates to an apparatus for heating plastics material pre-forms. In the field of the beverage production industry it has become customary to use plastics material containers for filling purposes. In this case plastics material pre-forms are usually shaped by blow moulding machines, and in particular stretch blow moulding machines, to form the plastics material containers. In these shaping processes, it is necessary for the plastics material pre-forms first to be heated. For this purpose, use is usually made in the prior art of infrared furnaces through which the plastics material pre-forms are conveyed. In this case, the plastics material pre-forms are conveyed past a series of heating modules.

In recent years, however, there has also been a move towards the provision of individual heating devices or heating cavities respectively, by means of which the individual plastics material pre-forms are heated. These heating cavities are usually arranged in this case on a common carrier. A procedure which has become known from the prior art in the heating of plastics material pre-forms consists in microwave furnaces. In this case, the individual operating stations of a microwave resonator are used to heat the PET plastics material pre-forms to a defined temperature profile. For the process control, on the one hand the temperature of the plastics material pre-forms in the heating zone is controlled for example by means of pyrometers and a rate of the method and also a switch-off point are adapted therewith. On the other hand, the resonator is also kept at its output maximum. In order to achieve this, the individual operating stations are frequently provided with pyrometers, plasma sensors, and also regulating devices such as for example tuning pins, and in addition, however, also with further measuring instruments.

In the prior art, the individual operating stations are controlled by a central control device such as a central PLC and are usually wired directly with the latter. The process control of an operating station is carried out substantially independently of other operating stations and also usually independently of the carrier, for example a rotor. In this case, however, the problem arises that the wiring is very expensive, since a considerable amount of sensor devices and actuating devices is required and these individual elements have to be actuated in each case. A correspondingly large amount of wiring also has to be detached and wired up again for replacement. A replacement of individual operating stations in the plant is therefore expensive. In addition, the operating stations can also not be pre-fabricated in series as a mechatronic unit, which results in a relatively low flexibility. In addition, the computing power and the wiring also have to be adapted with each change in the number of the operating stations.

SUMMARY

The object of the present invention is therefore to provide an apparatus for heating plastics material pre-forms which is kept simpler in its design with respect to the prior art. In this case, in particular, the outlay in cabling or wiring respectively should also be reduced.

An apparatus according to the invention for heating plastics material pre-forms has a movable carrier on which a plurality of heating devices is arranged. In this case these heating devices are controllable independently of one another and have in each case a heating element as well as at least one regulating element for regulating the heating output. In addition, these heating devices have in each case at least one heating area inside which the plastics material pre-forms are capable of being heated as well as a movement device which introduces the plastics material pre-forms into this heating area.

According to the invention, each heating device has associated with it in each case one control device in order to control a heating procedure.

In this case, it is possible and preferable for each heating device to have precisely one control device and, in this way, for each of these control device[s] to have associated with it precisely one heating device. It would also be possible, however, for modules to be formed from a plurality of heating devices, for example from 2 to 4, and for these modules to have associated with them in this case precisely one control device. It is preferable for these control devices to form integral component parts of the respective heating devices in each case.

It is therefore proposed that, instead of the central control means customary in the prior art, each individual heating device should have associated with it a separate control device. It is advantageous for the movable carrier to be a rotatable carrier, so that the individual heating devices may be moved in an advantageous manner along a circular path. It is preferable for the heating device to be a rotary furnace.

It is advantageous for the movement device to move the plastics material pre-forms into the heating area in a longitudinal direction of the plastics material pre-forms.

It is therefore proposed that the process control of each heating device should preferably take place in a manner independent of a central control means. In this way, it is made possible for each individual heating device to have a separate control device which controls the process independently. It is possible in this case for only one starting signal to be given.

In addition, on account of the procedure according to the invention a very rapid control is also possible since a control can be carried out in the range of milliseconds. In contrast, it is necessary in the prior art for a very powerful PLC to be used for the simultaneous control of a plurality of heating devices by a control unit. In this way, on account of the procedure according to the invention, the ease of servicing is improved and, on the other hand, the piece costs can be reduced and can also become independent of the computing power of a central control means.

It is advantageous for the control device to be designed in such a way that it can take on the entire process control for the heating device associated with it. In this case it is then possible for only a few control commands to be issued from a superordinated machine control means, such as for example a start command.

In the case of a further advantageous embodiment the apparatus therefore also has a central control unit which communicates with the individual control devices of the individual heating stations. In this case, however, this communication can be made relatively simple and the central control unit can where possible issue only a few commands, such as for example a start command, in order to initiate a heating procedure, or further commands which indicate the conclusion or the termination of a heating procedure.

It is advantageous in this case for communication interfaces to be provided between the individual heating devices or the control devices thereof respectively and the central control unit. In addition, a mechanical connecting device can also be provided between the carrier and the individual heating devices.

In this way, in contrast to the prior art, each heating device is an independent, and in particular also a ready wired, module. For the installation of this module it is merely necessary for the latter to be fastened mechanically to the carrier or rotor respectively and to be attached to a power supply means as well as optionally to a communication interface on the main machine.

It would also be possible, in addition, for an individual heating device to be operated as an independent appliance, as a result of which further applications follow.

In addition, on account of the piece number a compact and expedient microcontroller can also be used, since the latter can also be individually adapted to the requirements of the individual heating devices and need not react for example to corresponding enlargements of the machine. In addition, a saving of structural space is also possible on account of the decentralized arrangement proposed here. In addition, the computing power of the central control unit can also be independent of the number of the individual operating stations.

In the case of a further advantageous embodiment each heating device also has a power measurement device for measuring the power. In this case for example a power device for measuring electrical power can be provided. It is advantageous for each heating device also to have a temperature measurement device for measuring at least one temperature, and in particular a temperature of the plastics material pre-forms. In this case temperature measurement devices can be provided which detect a temperature of the plastics material pre-forms without contact. In addition, it is also possible for each heating device to have more than one temperature measurement device of this type, so that, in particular, the temperatures of different ranges of the respective plastics material pre-form can be measured.

It is advantageous for at least one measurement device of each heating device to be selected from a group of measurement devices which includes pyrometers, plasma sensors, power measuring means and the like. In addition, each heating device also advantageously has a movement device which can be for example a rotary motor or even a linear drive, such as for example a z-axis servo motor.

In addition, each heating device advantageously has a plurality of drives of this type, so that, in particular, both a linear movement and a rotational movement is possible. In addition, the power regulating device can be for example so-called tuning pins which in the case of microwave heating can be moved into a region of a wave guide or even of a resonator in order to be able to adapt in this way the power to be applied to the plastics material pre-forms.

In the case of a further advantageous embodiment, each heating device is designed in the manner of a module and is preferably capable of being removed from the carrier and/or of being mounted on the carrier in its entirety. In this case it is proposed that each heating device is or has an independent heating module with a separate control means.

In the case of a further advantageous embodiment, the apparatus has a central power supply unit which supplies the individual heating devices with energy, and in particular with electrical energy. In addition, this power supply unit can be arranged on the movable carrier in this case.

It is advantageous for each heating device to have a wave guide for guiding microwaves. In addition, it is possible for each individual heating device to have a microwave generating unit. In the case of a further advantageous embodiment, each heating device has a resonator into which the plastics material pre-forms are capable of being introduced and in which the plastics material pre-forms can be heated. In this case it is possible for this resonator to surround the individual plastics material pre-forms completely during the heating procedure with respect to their longitudinal axis.

The present invention further relates to a method of heating plastics material pre-forms, in which the plastics material pre-forms are conveyed by means of a conveying device along a pre-set conveying path and are heated during this conveying. In this case, the conveying device has a movable carrier on which a plurality of heating devices is arranged, each of these heating devices heating at least one, and preferably precisely one, plastics material pre-form associated with it, and this plastics material pre-form being introduced by means of a movement device into a heating area of the heating device which heats this plastics material pre-form.

According to the invention, each heating device is controlled by a control device associated in each case with this heating device. In particular, the control device is a regulating device which regulates this heating procedure.

In the case of a further advantageous method a central control unit communicates with the control devices of the individual heating devices. It is advantageous in this case for this central control unit to issue only individual control commands for the heating procedure, such as for example a start command. The actual heating process is preferably controlled or regulated respectively by the individual control devices of the respective heating devices. In this case it is possible for example for the individual control devices of the heating devices to control a travelling profile or a movement profile respectively for the movement of the plastics material pre-form into the heating units and for the central control means to issue only the command that a heating procedure can now be started.

In the case of a further advantageous method, the central control unit issues to the individual control devices commands which are selected from a group of commands which contain start commands for the start of a heating procedure, stop commands for terminating the heating procedure and the like. In this case, it is possible for the central control unit also to issue these commands in a manner dependent upon a position of the individual heating devices in the peripheral direction of the apparatus, for example an angular position of the individual plastics material pre-forms. In this way, it is possible for example for the heating procedure always to be started after the plastics material pre-forms have been taken up by a specified heating device at a certain angular position and for the heating procedure always to be stopped at a further angular position. In this way, the central control unit can be kept very simple.

The present invention further relates to a heating device for heating plastics material pre-forms, which is designed in the manner of a module and which has a heating element for heating plastics material pre-forms, as well as at least one regulating element for regulating a heating device. In addition, this heating device has a heating area inside which the plastics material pre-forms are capable of being heated, as well as a movement device, which introduces the plastics material pre-forms into this heating area. In this case this heating device has a control device for controlling a heating procedure. In this way, it is also proposed that an individual heating device should have its separate control device which can control or regulate respectively a heating procedure substantially independently. It is advantageous for the heating device also to have a plurality of measurement devices which detect physical parameters of the heating procedure, such as for example an output and/or a temperature, it being preferable for the control device also to control or regulate respectively the heating procedure in a manner dependent upon these detected values or parameters respectively.

The present invention further relates to an apparatus for the production of plastics material containers. This apparatus has in this case a heating apparatus of the type described above, as well as a shaping apparatus arranged downstream of the latter for shaping plastics material pre-forms into plastics material containers. It is advantageous for this apparatus for shaping plastics material pre-forms into plastics material containers to be a blow moulding machine, and in particular a stretch blow moulding machine. In this case, it is advantageous for this shaping apparatus likewise to be a rotatable carrier on which a plurality of shaping stations for heating the plastics material pre-forms is provided. It is advantageous in this case for a control device to be provided, by means of which it is possible to ascertain or determine respectively which plastics material pre-form to be shaped by a specified shaping station has been heated by which heating device. In this way, a shaping procedure can also be controlled in a manner dependent upon the individual preceding heating procedure, or measurement values or parameters respectively of the heating procedure can also be used for the following shaping procedure.

In the case of one embodiment, the heating apparatus described above are microwave units. It is also possible, however, for the heating apparatus to be so-called STIR heating devices. In this case, the plastics material pre-forms are heated by means of infrared, in which case it is additionally advantageous for a rod-shaped body also to be introduced into an inner space of the plastics material pre-forms during the heating. With these designs, it is therefore advantageous for the heating devices to have in each case a rod-shaped body which is capable of being introduced into an inner space of the plastics material pre-forms. In addition, a movement device is also provided which introduces this rod-like body into the plastics material pre-forms. In addition, it would be possible both to move this rod-like body and, conversely, for a movement of the plastics material pre-form to be provided in the longitudinal direction thereof in order to introduce the rod-like body.

BRIEF DESCRIPTION OF THE DRAWINGS

Further advantages and embodiments are evident from the accompanying figures. In the drawings.

DETAILED DESCRIPTION

Figure 1:
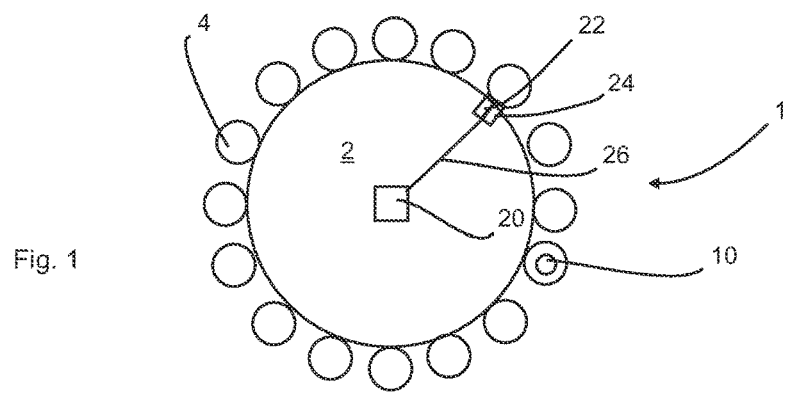
FIG. 1 is a diagrammatic illustration of an apparatus according to the invention.

FIG. 1 is a roughly diagrammatic illustration of an apparatus 1 according to the invention for the heating of plastics material pre-forms 10 (only one plastics material pre-form indicated diagrammatically). This apparatus 1 has in this case a rotatable carrier 2 on which a plurality of heating devices 4 is arranged. This means that the individual plastics material pre-forms 10 are heated in the individual heating devices 4 during their movement along a circular path.

The reference number 22 designates in a roughly diagrammatic manner a mechanical connecting device by which the heating device can be arranged on the carrier 2.

The reference number 24 designates in a diagrammatic manner an electrical connecting device for attaching the heating device electrically. In this case, this electrical connecting device constitutes in particular an electrical connection between the control device of the respective heating device and a central control unit. In addition, the electrical connecting device 24 can also produce a connection between a central energy supply unit 20 and the respective heating device. This energy supply unit 20 can be arranged on the carrier 2 in this case. It would also be possible, however, a stationary energy supply unit to be provided and for the electrical supply to be transmitted to the carrier by way of means such as slip rings. The reference number 26 designates an electrical connecting line for supplying the individual heating devices 4.

Figure 2:
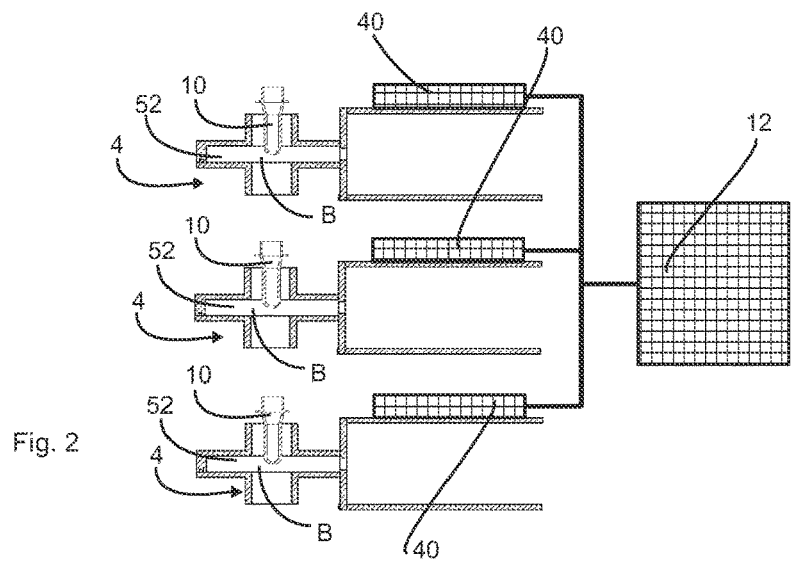
FIG. 2 is a more detailed illustration of a control concept.

FIG. 2 is an illustration to explain the control concept proposed here. In this case three heating devices 4 are illustrated here, which have in each case separate control devices or regulating devices 40 respectively. These control devices 40 control in this case the individual heating of the individual plastics material pre-forms 10 which are heated inside the respective resonators 52 or the heating areas B respectively. In addition, a central control unit 12 is provided which is also connected in terms of communication with the control devices 40. This central control unit 12 also advantageously comprises in this case an energy supply (not shown) in order to supply the individual heating devices 4 with energy, and in particular with electrical energy. In this case, however, it can also be provided that the central control unit 12 issues the respective start commands to the control devices 40. It is advantageous for the central control unit 12 to be designed in this case in such a way that the start commands to the individual control devices 40 are issued in a manner staggered in time. In this way, the energy requirement can be distributed in terms of time and the occurrence of power peaks can be prevented.

Figure 3:
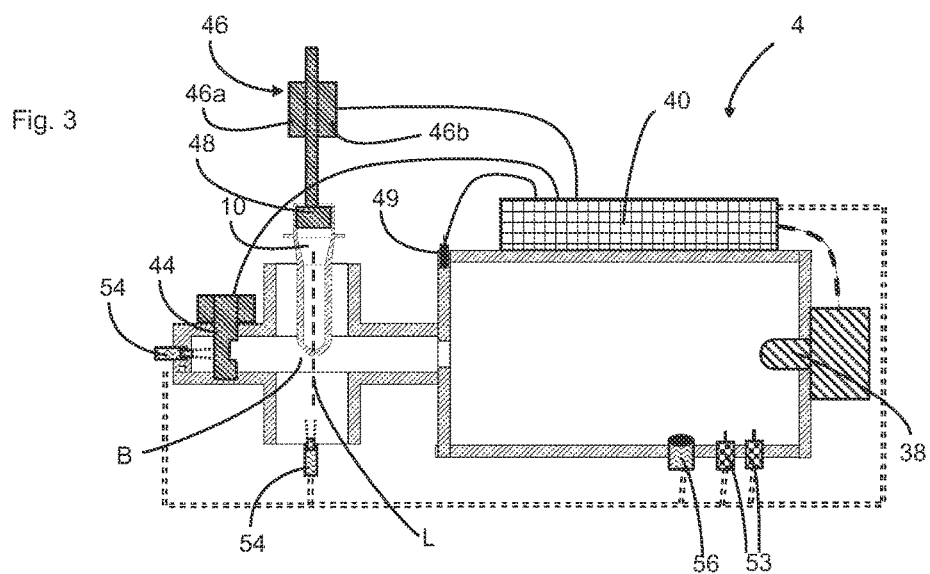
FIG. 3 is an illustration of an individual heating device.

FIG. 3 is a more detailed illustration of an individual heating device 4. This heating device 4 has in this case a drive or a movement device respectively which is designated 46 as a whole and which has the effect that the plastics material pre-forms 10 are introduced into the resonator or into the heating area respectively. In this case this movement device 46 can be designed for example in the form of a linear motor with a stator or a primary part 46a respectively and a movable secondary part 46b. In addition, the movement device can also cause a rotation of the plastics material pre-forms 10 with respect to the longitudinal axis L thereof. It would also be possible, however, for two different drives to be provided for producing the rotational movement and the linear movement. These drives are preferably linear motors and/or servo motors.

The reference number 48 designates a holding element which is designed in this case in the form of a holding mandrel which is introduced into an aperture of the plastics material pre-forms and, in this way, holds the latter from the inside. It will be noted that this movement device 46 too is controlled by the control device 40.

The reference number 44 designates a regulating unit which can be moved in this case for example into the resonator in order to control in this way the microwave power applied to the plastics material pre-forms 10.

The reference numbers 54 designate temperature measuring devices which in this case detect a temperature of the plastics material pre-forms without contact. In the case of this embodiment the temperature measuring devices are designed in the form of pyrometers. It is advantageous for two temperature measuring devices 54 of this type to be provided in this case, one of these pyrometers being directed towards an underside or an apex region respectively of the plastics material pre-form 10 and the other one being directed towards a lateral wall region.

Furthermore the regulating device 44 can also have a movement device which moves the regulating pin, for example turns it or displaces it in the longitudinal direction thereof. In addition, it would also be possible for a plurality of regulating pins of this type to be provided.

The reference number 49 refers to a further sensor device, this sensor device being in this case a temperature sensor which preferably detects a temperature of a housing part. In addition, further measuring devices 53 and 56 are provided, the reference number 53 referring in this case to microwave sensors which determine a microwave output and reference number 56 designating a plasma sensor. All these measuring devices and sensors respectively also pass their respective measurement signals on to the control device 40 and these measurement signals are also taken into consideration during the heating of the plastics material pre-form 10. It will be noted that the regulating device 44 is also controlled by the control device 40.

The reference number 38 designates a microwave generating device which generates the microwaves for heating the plastics material pre-forms. In this case it is possible for a microwave generating device of this type to be arranged centrally or to serve a plurality of heating devices, but it would also be—and this is preferable—possible for each individual heating device to have associated with it one microwave source 38 in each case.

Furthermore, the heating device has connecting means (not shown) in order to arrange the heating device 4 on the carrier 2. In this case, as mentioned above, these connecting means are preferably both mechanical connecting means and electrical connecting means, by means of which an energy supply and also a communication connection to the central control unit 12 can be produced.

The Applicants reserve the right to claim all the features disclosed in the application documents as being essential to the invention, insofar as they are novel either individually or in combination as compared with the prior art.

The invention claimed is:

1. An apparatus for heating plastics material pre-forms, comprising:
   a movable carrier;
   a plurality of heating devices, each of said plurality of heating devices being an independent, ready-wired module arranged on said carrier, said module being configured to be readily attached to a power supply and a communication interface, wherein said plurality of heating devices are controlled independently of each other and each of the plurality of heating devices have a heating element and at least one regulating unit configured for regulating a heating output, wherein said plurality of heating devices are microwave units;
   said plurality of heating devices each having a heating area inside which the plastics material pre-forms are heated, and a movement device which introduces the plastics material pre-forms into said heating area;
   each of said plurality of heating devices having a control device configured for controlling a heating procedure of the plastics material pre-forms, and a power measurement device configured for measuring power of a respective one of said plurality of heating devices, wherein said power measurement device is selected from a group of measurement devices including pyrometers, plasma sensors and power measuring means; and
   a central control unit configured to communicate with and control said control device of each of said plurality of heating devices.

2. The apparatus according to claim 1, further comprising at least one microwave generating device and each of said plurality of heating devices has a resonator for heating the plastics material pre-forms.

3. The apparatus according to claim 1, wherein each said ready-wired module is removable from the carrier.

4. The apparatus according to claim 1, further comprising a central power supply unit which supplies said plurality of heating devices with electrical energy.

5. The apparatus of claim 1, wherein the control device is configured to control a heating profile and a movement profile of the plastics material pre-forms into and out of the heating area.

6. A method of heating plastics material pre-forms, comprising:
   conveying plastics material pre-forms using a conveying device along a pre-set conveying path and heating the preforms during this conveying, wherein the conveying device has a movable carrier;
   connecting a plurality of heating devices configured as independent, ready-wired modules, to said movable carrier, wherein each of said modules is configured to be readily attached to a power supply and a communication interface, and wherein said plurality of heating devices are microwave units;
   introducing said plastics material pre-forms by a movement device into a heating area of one of said plurality of heating devices which heats one of said plastics material pre-forms;
   heating at least one of said plastics material pre-forms by a corresponding one of said plurality of heating devices;
   controlling a heating profile and a movement profile of each of the plastics material pre-forms by a plurality of control devices, a different one of said plurality of control devices being associated with each of said plurality of heating devices;
   regulating a heating output of said plurality of heating devices using at least one regulating unit;
   measuring power of each of said plurality of heating devices using a power measurement device associated with each of said plurality of heating devices; and
   controlling each of said plurality of control devices using a central control unit in communication with said plurality of control devices.

7. The method according to claim 6, further comprising issuing commands by said central control unit to each of said plurality of control devices, wherein the commands are selected from a group of commands which contains start commands for the start of a heating procedure, and stop commands for terminating the heating procedure.

8. An apparatus for heating plastics material pre-forms, comprising:
   a movable carrier;
   a plurality of heating devices, each of said plurality of heating devices being an independent, ready-wired module arranged on said carrier, said module being configured to be readily attached to a power supply and a communication interface, wherein said plurality of heating devices are controlled independently of each other and each have a heating element and at least one regulating unit configured for regulating a heating output, wherein said plurality of heating devices are microwave units;

said plurality of heating devices each having a heating area inside which the plastics material pre-forms are heated, a movement device which introduces the plastics material pre-forms into said heating area, and a power measurement device configured for measuring power of a respective one of said plurality of heating devices, wherein said power measurement device is selected from a group of measurement devices including pyrometers, plasma sensors and power measuring means, wherein each of said plurality of heating devices have a control device configured for controlling a heating procedure of the plastics material pre-forms, and said control device of each of said plurality of heating devices forms an integral component part of a respective one of said plurality of heating devices so that said control device of each of said plurality of heating devices is mounted onto a housing part of each of said plurality of heating devices; and a central control unit configured to communicate with and control said control device of each of said plurality of heating devices.

9. The apparatus according to claim 8, wherein each said control device is in direct contact with an outer face of said housing part of each of said plurality of heating devices.

10. The apparatus according to claim 8, wherein said housing part encloses a microwave generating device that generates microwaves for heating the plastics material pre-forms.

11. The apparatus according to claim 8, wherein said carrier is rotatable such that said plurality of heating devices are moved along a circular path.

12. The apparatus according to claim 8, wherein each of said plurality of heating devices are rotary furnaces.

13. The apparatus according to claim 8, wherein said movement device associated with each of said plurality of heating devices is one of a rotary motor or a linear drive, to enable both linear and rotational movement of said plurality of heating devices.

14. The apparatus according to claim 8, wherein said at least one regulating unit associated with each of said plurality of heating devices is configured to move a regulating pin in each of the plurality of heating devices in a longitudinal direction to control the heat output of the plurality of heating devices.

15. The apparatus of claim 8, further comprising a microwave sensor configured for determining a microwave output, and a plasma sensor.

16. An apparatus for heating plastics material pre-forms, comprising:

a movable carrier;

a plurality of heating devices, each of said plurality of heating devices being an independent, ready-wired module arranged on said carrier, said module being configured to be readily attached to a power supply and a communication interface, wherein said plurality of heating devices are controlled independently of each other and each of the plurality of heating devices have a heating element and at least one regulating unit configured for regulating a heating output;

said plurality of heating devices each having a heating area inside which the plastics material pre-forms are heated, and a movement device which introduces the plastics material pre-forms into said heating area; and at least two temperature measuring devices associated with each of said plurality of heating devices, a first one of said temperature measuring devices positioned on a longitudinal axis of said plastics material pre-forms and directed toward a first region of said plastics material pre-forms, and a second one of said temperature measuring devices positioned to be perpendicular to said longitudinal axis of said plastics material pre-forms and directed toward a side of said plastics material pre-forms, wherein said at least two temperature measuring devices are configured to measure different regions of said plastics material pre-forms, wherein each of said plurality of heating devices have a control device configured for controlling a heating procedure of the plastics material pre-forms, and a power measurement device configured for measuring power of a respective one of said plurality of heating devices, wherein said power measurement device is selected from a group of measurement devices including pyrometers, plasma sensors and power measuring means.

* * * * *